United States Patent Office 3,246,415
Patented Apr. 19, 1966

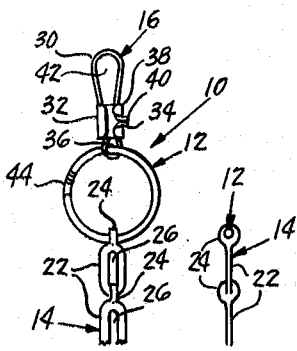
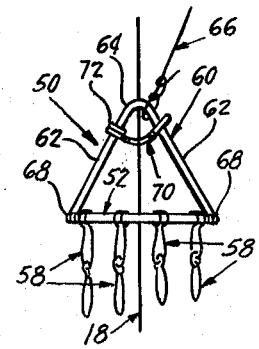
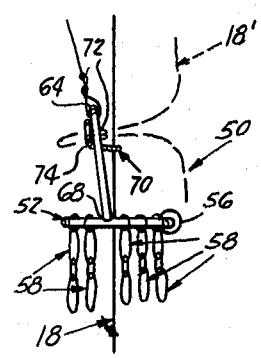
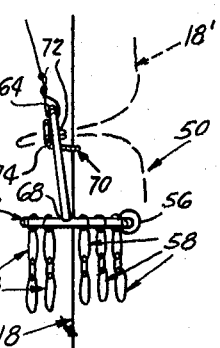
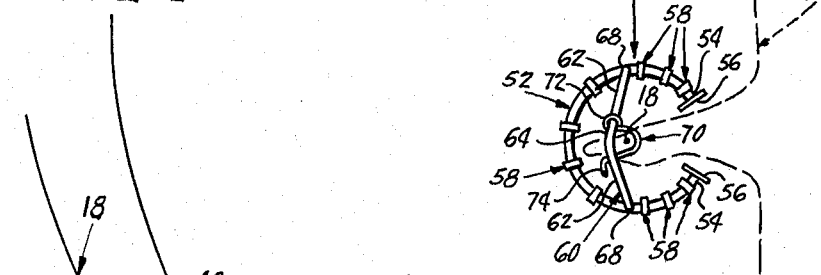
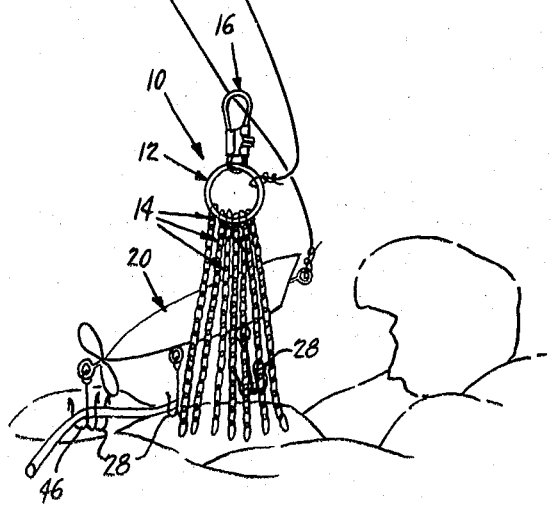
INVENTOR.
LARRY G. FORBES
BY Kimmel & Crowell
ATTORNEYS.

3,246,415
FISHING PLUG RETRIEVER
Larry G. Forbes, 1605 Park Blvd.,
West Sacramento, Calif.
Filed Aug. 6, 1964, Ser. No. 387,972
1 Claim. (Cl. 43—17.2)

This invention relates to a fishing plug retriever and relates more particularly to a device for use with a fishing line to disengage a snagged or snared plug or lure.

The primary object of this invention is the provision for a device of the type described which is sturdy and durable in construction, reliable and efficient in operation, and relatively simple and inexpensive to manufacture, utilize and maintain.

Another object of this invention is to provide a fishing plug retriever including novel means to slidably engage the same with a fishing line without the necessity of cutting the line.

A further object of this invention is the provision of a plug retriever having a plurality of elongated flexible chain members each including a plurality of pivotally connected link members defining openings adapted to engage over and thereby unsnare a fishing hook.

Yet another object of the instant invention is to provide such a device which may be quickly and easily attached to the fishing line and removed therefrom after the lure or plug has been retrieved.

Other and further objects reside in the combination of elements, arrangements of parts and features of construction.

Still other objects will in part be obvious and in part pointed out as the description of the invention proceeds and as shown in the accompanying drawing wherein:

FIGURE 1 is a side elevational view showing the use of one form of the device of the instant invention to disengage a snagged fishing plug;

FIGURE 2 is an enlarged elevational view of the embodiment shown in FIGURE 1 with a portion of one flexible chain member being shown carried thereby;

FIGURE 3 is a schematic side elevational view showing the manner in which the links are pivotally connected to each other and to the support member;

FIGURE 4 is a rear elevational view of another embodiment of fishing plug retriever in accordance with the instant inventive concept;

FIGURE 5 is a side elevational view thereof showing the manner in which the fishing line is engaged therewith in dotted lines; and FIGURE 6 is a top plan view of the embodiment of FIGURES 4 and 5 with the fishing line being engaged as shown in dotted lines.

Like reference characters refer to like parts throughout the several views of the drawing.

Referring now to the drawing in general, and more particularly to FIGURES 1 to 3, one embodiment of the instant invention is designated by the reference numeral 10 and comprises basically a support member 12 in the form of a support ring such as a key ring, a plurality of elongated flexible chain members 14 being slidably carried by the support member 12 in spaced relationship (only one chain member being shown in FIGURE 2 for illustrative clarity) and a fishing line engaging means 16 also being carried by the support member 12 for slidingly receiving a fishing line 18 secured to a snagged plug 20 in a manner and for a purpose to be described in more detail hereinafter.

Each of the flexible chain members 14 includes a plurality of individual link members 22 pivotally interconnected and slidingly received on the support member 12 by upper loops 24 and defining openings 26 adapted to engage over a fishing hook 28 forming part of the plug or lure 20.

The fishing line engaging means 16 includes an arcuate wire element 30 with a latch member 32 fixedly connecting one end portion 34 of the wire element 30 to an intermediate portion of the same to define opening 36 slidingly received over the support member 12. The latch member 32 also includes a reverted ear 38 which defines means for receiving the other end portion 40 of the wire element 30, this other end portion 40 being resilient whereby it may be snappingly engaged in the reverted ear 38 to form a closed loop 42 which slidingly receives the fishing line 18.

The use and operation of the embodiment will now be obvious. Any desired number of chain members 14 may be provided on the support member 12 and may be connected thereto in any desired manner, the loop 24 of the top link 22 preferably being slipped through the split portion 44 if the support member 12 is made like a conventional key ring. The end portion 40 is then snappingly engaged in the reverted ear 38 and the plug retriever 10 is slid down along the fishing line 18, the weight of the chain members 14 overcoming any buoyant force of the water. A relatively heavy line or chain 48 is secured to the support member 12 and the user is able to use the line 48 to agitate the retriever 10 whereby the chain members 14 will disengage the snagged hook 28. If this agitation does not function to allow retrieval of the plug 20, one of the openings 26 of the link members 22 will eventually be engaged over the hook 28 catching in the bight 46 of the same whereby the control line 48 may be pulled to either break the obstacle or the hook thereby allowing retrieval of the relatively expensive plug. If the fishing line 18 were pulled in this manner it would have a tendency to break causing loss of the entire plug, but since the control line 48 is relatively heavy it will allow for a much greater force to be applied.

Referring now to FIGURES 4 and 6, a modified embodiment of the plug retriever of this invention is designated generally by the reference numeral 50 and comprises basically a support member 52 in the form of a horseshoe as will be best seen in FIGURE 6 having opposed spaced end portions 54 with enlarged discs 56 thereon to preclude loss of a plurality of elongated flexible chain members 58 which may be the same as the chain members 14 in the embodiment of FIGURES 1 to 3. In this embodiment the fishing line engaging means is comprised of an inverted V-shaped element 60 having a pair of legs 62 integral at one end to form an apex 64 to which the control line 66 is attached, with the lower end of the leg members 62 being secured to opposed portions of the support member 52 at 68 in spaced relationship to the end portions 54 of the same. An arcuate clip element 70 has one end 72 fixedly secured to one of the leg members 62 adjacent the apex 64 of the V-shaped element 60. The free opposite end 74 of the arcuate clip element 70 is reverted as will be seen particularly in FIGURES 5 and 6 and extends in juxtaposition to the other of the leg members 62 adjacent the apex 64 of the V-shaped element 60.

The use and operation of the embodiment of FIGURES 4 to 6 is substantially the same as the earlier embodiment except for the engagement of the fishing line 18. As shown at 18' in dotted lines in FIGURES 5 and 6, the fishing line is bent to form a loop which is slipped through the space between the arcuate clip element 70 and the apex 64 of the V-shaped element 60 and then engaged over the reverted end portion 74 of the clip element 70 so that it will be retained by the fishing line engaging means without necessitating cutting or damaging the line.

It will now be seen that there is herein provided an improved fishing plug retriever which satisfies all of the objectives of the instant invention, and others, including many advantages of practical utility and commercial importance.

Since many embodiments may be made of this inventive concept, and since many modifications may be made of the embodiments hereinbefore shown and described, it will be understood that all matter herein is to be interpreted merely as illustrative and not in a limiting sense.

I claim:

A fishing plug retriever comprising a support member, a plurality of elongated flexible chain members slidably carried by said support member in spaced depending relationship, a fishing line engaging means carried by said support member for slidably receiving a fishing line secured to a snagged plug, wherein said support member is horseshoe-shaped having opposed spaced end portions, said fishing line engaging means including an inverted V-shaped element having a pair of leg members integral at one end to form an apex and secured at their other ends to oppose portions of said support member in spaced relationship to the end portions of said support member, and an arcuate clip element having one end fixedly secured to one of said leg members of said V-shaped element adjacent said apex and a free opposite end reverted and extending in juxtaposition to the other of said leg members adjacent said apex.

References Cited by the Examiner

UNITED STATES PATENTS

| | | | |
|---|---|---|---|
| 2,482,037 | 9/1949 | Swaim | 43—17.2 |
| 2,494,012 | 1/1950 | Stricker | 43—17.2 |
| 2,676,430 | 4/1954 | Richard | 43—17.2 |
| 2,732,650 | 1/1956 | Passmore et al. | 43—12.2 |
| 2,764,833 | 10/1956 | Clark | 43—17.2 |
| 3,156,064 | 11/1964 | Czirr | 43—17.2 |
| 3,163,955 | 1/1965 | Lockwood | 43—17.2 |

SAMUEL KOREN, *Primary Examiner.*